United States Patent [19]

Lin et al.

[11] Patent Number: 4,734,203

[45] Date of Patent: Mar. 29, 1988

[54] COPPER CHELANTS/DISPERSANTS AND THEIR APPLICATIONS FOR BOILER INTERNAL TREATMENT

[75] Inventors: Mei-Jan L. Lin, Naperville; Frederick J. Sibert, Chicago, both of Ill.

[73] Assignee: Nalco Chemical Company, Naperville, Ill.

[21] Appl. No.: 21,076

[22] Filed: Mar. 3, 1987

[51] Int. Cl.$^4$ ................................................. C02F 5/12
[52] U.S. Cl. ................................ 210/698; 252/180; 252/391; 252/392; 422/16
[58] Field of Search .......................... 210/698–701; 252/180, 181, 390, 391, 392; 422/16

[56] References Cited

U.S. PATENT DOCUMENTS

| | | | |
|---|---|---|---|
| 3,803,042 | 4/1974 | Knox et al. | 210/698 |
| 4,190,709 | 2/1980 | Hodgkin | 423/24 |
| 4,465,620 | 8/1984 | Thompson | 252/180 |
| 4,545,920 | 10/1985 | Lorenc et al. | 210/701 |
| 4,657,785 | 4/1987 | Kelly et al. | 422/16 |

*Primary Examiner*—Peter Hruskoci
*Attorney, Agent, or Firm*—John G. Premo; John S. Roberts, Jr.; Anthony L. Cupoli

[57] ABSTRACT

This invention discloses a method of improving the constitution of boiler water by adding thereto an effective amount of a copper transport agent which is either rubeanic acid or a low molecular weight polymer of polypiperazine methyl-para-hydroxysulfonic acid or polypiperazine methyl-para-hydroxybenzoic acid. The copper transport agent satisfactorily separates the copper from iron, calcium, magnesium and other heavy metals with a high degree of selectivity. The chelant may be added in a ratio of 100/1 to 10/1 chelant/copper and an advantageous ratio in the case of the polymer is 50/1 ppm active polymer to 1 ppm Cu. The chelants, which form a soluble chelate with Cu, is capable of removing Cu through boiler blowdown in an operating, layup or cleanup boiler. This adds an anti-corrosion factor to the galvanized boiler corrosion.

5 Claims, No Drawings

COPPER CHELANTS/DISPERSANTS AND THEIR APPLICATIONS FOR BOILER INTERNAL TREATMENT

PRIOR ART

The present invention is concerned with the utilization of copper chelants or dispersants which have an application in transporting copper ions, sulfides and oxides through a boiler. It has been found that, especially in use, boilers utilizing 1,000 psig and at high temperature or alternately stated at high temperature and presure, develop heavy metal deposition in the interface of the boiler which engenders scale and corrosion. Of the heavy metals copper deleteriously forms sandwich-type coating with iron from copper ions and oxides present in the boiler water.

Two compositions have come to the fore as specific copper chelants or dispersants. These compositions are known as copper transport compositions and they are as follows: (piperazine methyl-para-hydroxy-sulfonic acid)$_n$ or (piperazine methyl-para-hydroxy-benzoic acid)$_n$, and their alkali metal salts where the polymer has n equals 2 to 20 units. The second compound is rubeanic acid (dithioxamide). The polymer above and the rubeanic acid are soluble in alkaline water or aqueous alkaline. Both compounds may be utilized in a combination treatment using a copper corrosion inhibitor such as tolyltriazole and benzotriazole with one or both chelants.

In the polypiperazine compound, the para-position for the hydroxybenzoic acid appears to be critical and with the rubeanic acid in the structure, the effect of the sulfur ion appears to qualify the chelant activity. The piperazine compound is known as a copper selective chelating resin. The complexation of copper ions with selective chelating resin is noted in "Copper Selective Chelating Resins", Hodgkin and Eibl, Reactive Polymers, 3: 83-89 (1985). The article mentions condensation polymer prepared from phenol, formaldehyde, and piperazine in a Mannich reaction which was found to selectively chelate copper ions.

A water-insoluble ion exchange copper chelating resin was reported in U.S. Pat. No. 4,190,709, issued Feb. 28, 1986. The resin is also a Mannich type condensation polymer, resulting from the reaction among formaldehyde, piperazine and phenol. As the reactivity of phenol is trifunctional, a three-dimensional crosslinking reaction results in a water-insoluble product.

The other copper transporting agent is dithioxamide, also known as rubeanic acid, with the formula $$SC(NH_2)C(NH_2)S$$

This compound selectively chelates copper ions utilizing the chelant qualities of the sulfur ions.

SUMMARY OF THIS INVENTION

For copper transport in aqueous alkaline boiler water, an alkaline water-soluble copper chelating polymer was desired. Blocking one of the phenol reactive sites prevents the three-dimensional crosslinking, P-cresol where the para-position is blocked by a methyl group, was substituted for the phenol. The product was, however, only soluble in low pH acidic water. Active site blocking carboxylate (P-hydroxy sodium benzoate) or sulfonate (P-phenol sodium sulfonate) groups gave aqueous alkaline soluble polymer products. O-hydroxy sodium benzoate and mixtures of ortho and para phenol sulfonates also gave soluble polymers.

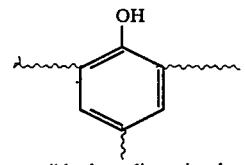

possible three-dimensional crosslinking using phenol

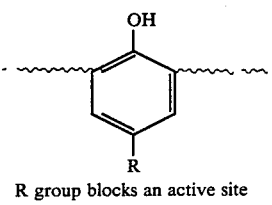

R group blocks an active site insuring a linear polymer

Alkaline soluble polymers were also prepared using other types of amines. Glycine and monoethanolamine were substituted for piperazine. These products were not as effective under boiler conditions. This suggests that the cyclic structure of amines is important for effective copper chelation.

In Table 1 below, which includes evidence of working examples of the present application, efficacy of rubeanic acid, carboxylated and sulfonated polymers copper transport agents, are shown clearly at 1000 psig pressure. The boilers in this case have a corresponding saturated steam temperature of 284.4 degrees C. The corresponding saturated steam temperature for 1800 psig boilers is 327.2 degrees C.

The standard test condition is as follows:
Test equipment: experimental boilers,
Feedwater: 1 ppm Ca, 0.5 ppm Mg, 0.5 ppm SiO2, various concentrations of copper (typical 0.1-0.5 ppm)
Blowdown: pH 10.1-11.5, recommended sulfite residual, 10 cycles, and two days.

DOSAGE

The dosage in comparing treating agent, active amount, over the copper ppm in solutions for the polymer 50:1 to 1:50; for rubeanic acid 25:1 to 1:25. The next treating agent to copper range is 100:1 to 10:1 and the narrow range is 50:1 to 10:1.

Rubeanic acid has the advantage over the polymers in high pressure applications (1800 psig). However, polymers have less ammonia generation to the steam which is favorable in terms of after boiler copper metal corrosion. The sulfonated version of the polymer has the advantage of over the carboxylated version due to higher water solubility at a wider pH range (pH 6.5 and above). A comparison of the complexing ability of the three compositions or compounds is included in Table 2.

TABLE 1

Comparison of Copper Transport Performance
Rubeanic Acid vs. Polymer Resin

| | Heat Transfer Surface Appearance | | |
|---|---|---|---|
| | | Polymer Resin | |
| Boiler Test | Rubeanic Acid | Carboxylate | Sulfonate |
| Standard Test: | | | |
| 1000 psig, 100 ppb Cu | Clean at 25/1* | Clean at 50/1 | Clean at 50/1 |
| 1000 psig, 4-day 100 ppb Cu | Clean at 25/1 | Cu/Polymer at 50/1 Deposition, medium | Clean at 50/1 |
| 1000 psig, 2-day 500 ppb Cu | Clean at 20/1 | Cu/Polymer Deposition, medium | Clean at 50/1 Light Dep. at 40/1 |
| 1000 psig 2-day Steam drum feed 100 ppb Cu | Clean at 25/1 Higher Cu in the blowdown | — | Clean at 75/1 |
| 1000 psig 2-day "H" Treatment underdose 100 ppb Cu | <3% Cu in Deposits, High Cu Selectivity | <3% Cu in Deposits, High Cu Selectivity | Minimal amounts of Cu deposition High Cu Selectivity |
| 1000 psig Hi-Alk. 100 ppb Cu | Clean at 25/1 | Clean at 50/1 | Clean (assumed) |
| 1000 psig Hi-Alk. 100 ppb Cu | Clean at 25/1 | Clean at 50/1 | Clean (assumed) |
| 100 psig, Dosage reduction, ½, 100 ppb Cu | Clean at 12.5/1 | Cu Deposition | Cu Deposition at 25/1 |
| 1800 psig, "0" hardness | Clean at 50/1 | Cu Deposition | — |

*Dosage in ppm active per ppm Cu

TABLE 2

Comparison of Complexing Ability

| | Rubeanic Acid | Polymer Resin |
|---|---|---|
| Molecular Weight | 120 | 308 (Na Salt per Mer Unit) |
| Dosage at 1000# | 25/1 (12.5/1) | 50/1 ppm active/ppm Cu |
| Mol Ratio, Treatment/Cu | 13/1 (6.5/1) | 10/1 (5/1 for 2:1 complex) |
| $SO_2$ in the Steam | 0.53 ppm | 0.21 ppm assuming 100% Decomposed Treating 20 ppb Cu in the Feedwater |
| $NH_3$ in Steam | 0.14 ppm | 0.11 ppm assuming 100% Decomposed Treating 20 ppb Cu in the Feedwater |

What is claimed is:

1. A method of chelating and transporting copper ions, sulfides and oxides in boiler water which comprises adding to said water an effective liquid chelant amount of a chelant selected from the group consisting of rubeanic acid and a water-soluble polymer of (piperazine methyl-para-hydroxysulfonic acid)$_n$, and (piperazine methyl-para-hydroxybenzoic acid)$_n$, and their alkali metal salts, wherein the polymers have an n value of 2–20, to chelate and transport said copper in said boiler water.

2. The method of claim 1 wherein the effective liquid chelant amount is about 500/1 to 1/1 of active amount ppm/copper amount ppm.

3. The method of claim 1 wherein the effective liquid chelant is rubeanic acid.

4. The method of claim 3 wherein the amount of rubeanic acid compared with the amount of copper is 200/1 to 2/1.

5. The method of claim 1 wherein the liquid chelant is said water soluble polymer.

* * * * *